US006854569B2

United States Patent
Chen

(10) Patent No.: US 6,854,569 B2
(45) Date of Patent: Feb. 15, 2005

(54) BRAKABLE WHEEL HUB DEVICE

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 10/392,992

(22) Filed: Mar. 18, 2003

(65) Prior Publication Data

US 2004/0182654 A1 Sep. 23, 2004

(51) Int. Cl.[7] .................................................. B62L 5/00
(52) U.S. Cl. ........................ 188/26; 188/17; 301/110.5
(58) Field of Search .......................... 188/17, 26, 24.11, 188/218 XL, 18 A; 301/110.5, 110.6, 6.1, 6.8; 192/217.3

(56) References Cited

U.S. PATENT DOCUMENTS

| | | | |
|---|---|---|---|
| 6,371,252 B1 * | 4/2002 | Kanehisa | 188/26 |
| 6,386,328 B1 * | 5/2002 | Chen | 188/24.11 |
| 6,530,457 B1 * | 3/2003 | Nago et al. | 188/26 |
| 6,540,306 B2 * | 4/2003 | Kanehisa | 301/59 |
| 6,578,676 B1 * | 6/2003 | Lin | 188/26 |

FOREIGN PATENT DOCUMENTS

FR      2794063-a1       * 12/2000

* cited by examiner

Primary Examiner—Matthew C. Graham
Assistant Examiner—Mariano Sy
(74) Attorney, Agent, or Firm—DLA Piper Rudnick Gray Cary US LLP

(57) ABSTRACT

A brakable wheel hub device includes a hub shell adapted to be rotatably mounted on an axle, and having a disk securing portion which has an internally threaded section and a plurality of insert holes at a right end thereof that contacts a brake disk. A positioning ring is disposed outboard to the brake disk, and has a plurality of axially extending protrusions which pass through the brake disk and which are fitted into the insert holes so as to place the brake disk in a spline engagement with the hub shell. A surrounding locking member has an insert segment with an externally threaded section to threadedly engage the internally threaded section through the brake disk, and an abutting segment to abut against the positioning ring, thereby securing the brake disk relative to the hub shell.

6 Claims, 5 Drawing Sheets

BRAKABLE WHEEL HUB DEVICE

BACKGROUND OF THE INVENTION

1. Field of the Invention

This invention relates to a brakable wheel hub device, more particularly to a brakable wheel hub device adapted to be rotatably mounted on a wheel axle of a bicycle.

2. Description of the Related Art

U.S. Pat. No. 6,371,252 B1 discloses a bicycle disc brake hub that includes a hub axle, and a hub shell rotatably coupled to the hub axle, and having a brake rotor attachment portion formed at an end thereof. The attachment portion has an external splined surrounding surface and an internally threaded surrounding surface. A mounting boss has internal splines to engage the external splined surrounding surface, and an axially extending protrusion to engage a brake rotor to prevent relative rotation. A locking ring has an externally threaded surface to threadedly engage the internally threaded surrounding surface of the attachment portion so as to secure the brake rotor relative to the hub shell. However, due to the particular construction of the hub shell and the mounting boss, manufacturing costs are relatively high. Moreover, since the locking ring directly abuts against the brake rotor, loosening of the threaded engagement between the locking ring and the attachment portion may occur after prolonged use and may result in disengagement of the brake disk from the hub shell.

SUMMARY OF THE INVENTION

The object of the present invention is to provide a brakable wheel hub device which is easy to fabricate at a relatively low cost, and which enables a brake disk to be secured relative to a wheel hub shell even after prolonged use.

According to this invention, the brakable wheel hub device includes a wheel hub shell having an inner surrounding shell surface which is adapted to spacedly surround a wheel axle, and which includes right and left inner surface segments opposite to each other along the axis. The right inner surface segment has an internally threaded section which extends in an axial direction. A disk securing portion extends from the right inner surface segment radially and outwardly, and has an outer surrounding wall surface that surrounds the axis. The disk securing portion has an abutting surface which is adapted to contact and to be disposed leftwardly of a brake disk that surrounds the axle, and a plurality of insert holes which extend leftwardly from the abutting surface.

A positioning ring surrounds the axle, and is disposed outboard to the brake disk. The positioning ring includes left and right surrounding surfaces opposite to each other in an axial direction, and proximate to and distal from the abutting surface, respectively, a passage which extends from the right surrounding surface through the left surrounding surface, and a plurality of protrusions which extend leftwardly and in the axial direction from the left surrounding surface and which respectively pass through a plurality of through holes in the brake disk so as to be fitted into the insert holes in the axial direction, thereby placing the brake disk in a spline engagement with the wheel hub shell.

A surrounding locking member includes an insert segment which has an outer insert surface that surrounds the axis, that is extendable through the passage and the brake disk, and that is formed with an externally threaded section to threadedly engage the internally threaded section, and an abutting segment which extends radially from the outer insert surface of the insert segment and which abuts against the right surrounding surface when the externally threaded section threadedly engages the internally threaded section, thereby forcing the left surrounding surface to displace towards the brake disk and the abutting surface.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
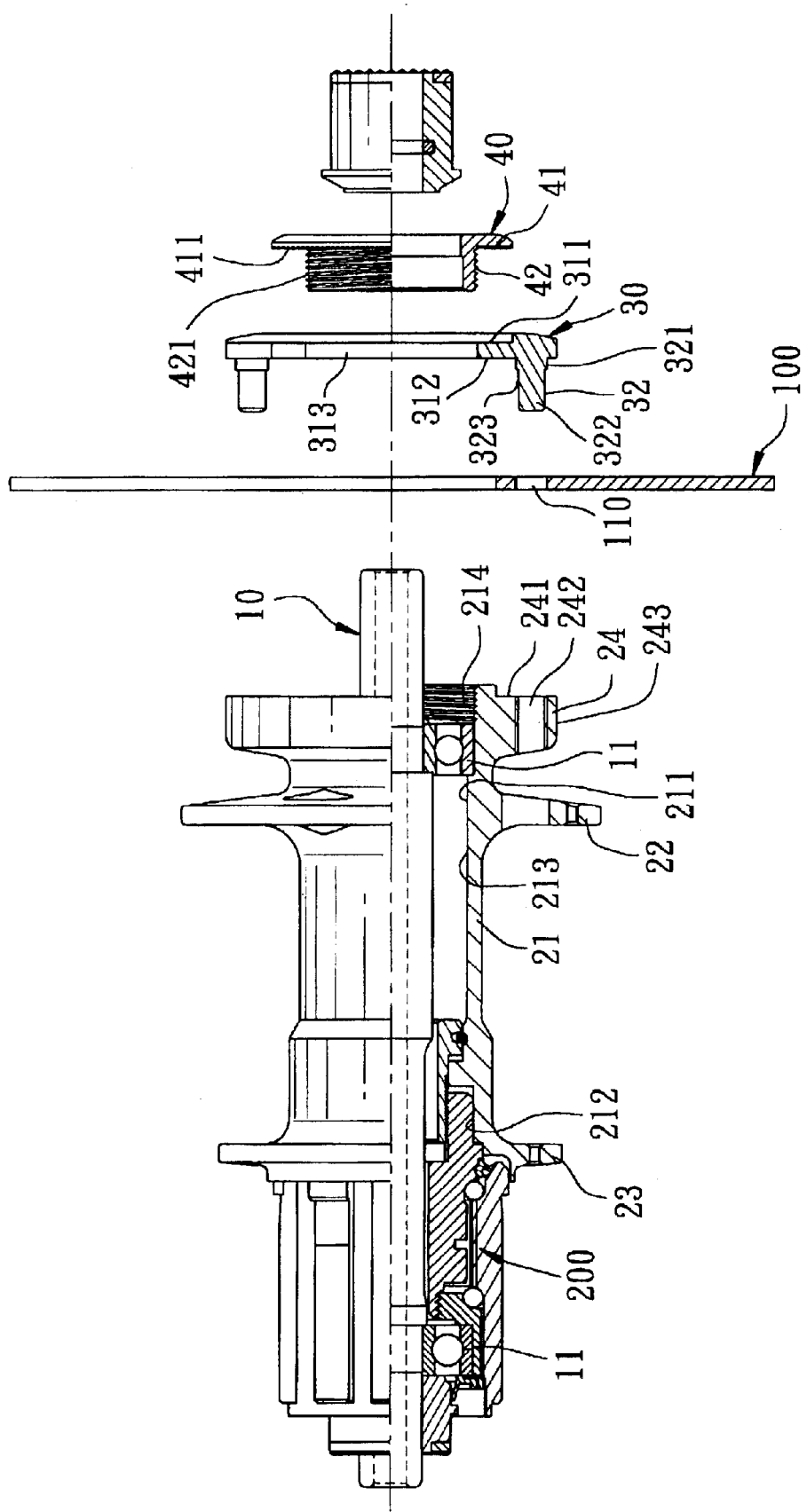
FIG. 1 is a partially sectional exploded view of the first preferred embodiment of a brakable wheel hub device according to this invention.

Before the present invention is described in greater detail, it should be noted that same reference numerals have been used to denote like elements throughout the specification.

Figure 2:
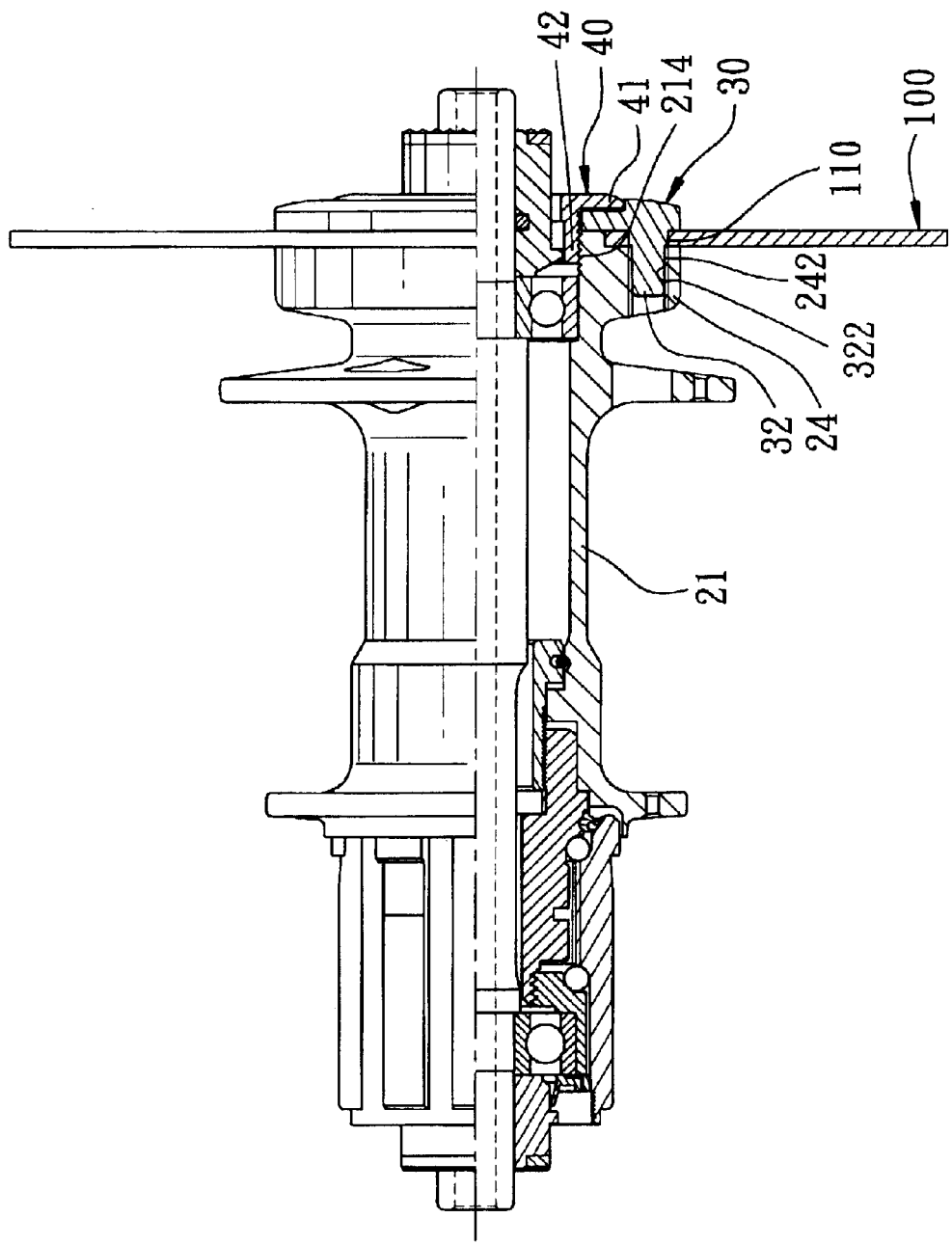
FIG. 2 is a partially sectional view of the first preferred embodiment in an assembled state.

Referring to FIGS. 1 and 2, the first preferred embodiment of a brakable wheel hub device according to the present invention is shown to be rotatably mounted on a rear wheel axle 10 about an axis in an axial direction by means of bearing members 11 in a known manner, and is shown to comprise a tubular wheel hub shell 21, a brake disk 100, a positioning ring 30, and a surrounding locking member 40.

The wheel hub shell 21 has an inner surrounding shell surface 213 which spacedly surrounds the axle 10, and which includes right and left inner surface segments 211,212 opposite to each other along the axis. The right inner surface segment 211 has an internally threaded section 214 which extends in the axial direction. The wheel hub shell 21 further has a disk securing portion 24 which extends from the right inner surface segment 211 radially and outwardly, and which has an outer surrounding wall surface 243 that surrounds the axis. The disk securing portion 24 has an abutting surface 241 which faces rightwardly and in the axial direction, and a plurality of insert holes 242 (six threaded holes in this embodiment) which extend leftwardly and in the axial direction from the abutting surface 241 and which are radially non-communicated with the outer surrounding wall surface 243 to serve as a first splined member. Further, right and left spoke mounting flanges 22,23 extend radially and outwardly from the wheel hub shell 21 for engaging wheel spokes (not shown). A sprocket driving mechanism 200 can be mounted proximate to the left spoke mounting flange 23.

The brake disk 100 is a standard brake disk, and has six angularly displaced through holes 110. The brake disk 100 surrounds the axle 10, and is disposed rightwardly of the abutting surface 241 in the axial direction so as to align the through holes 110 with the insert holes 242, respectively.

Figure 5:
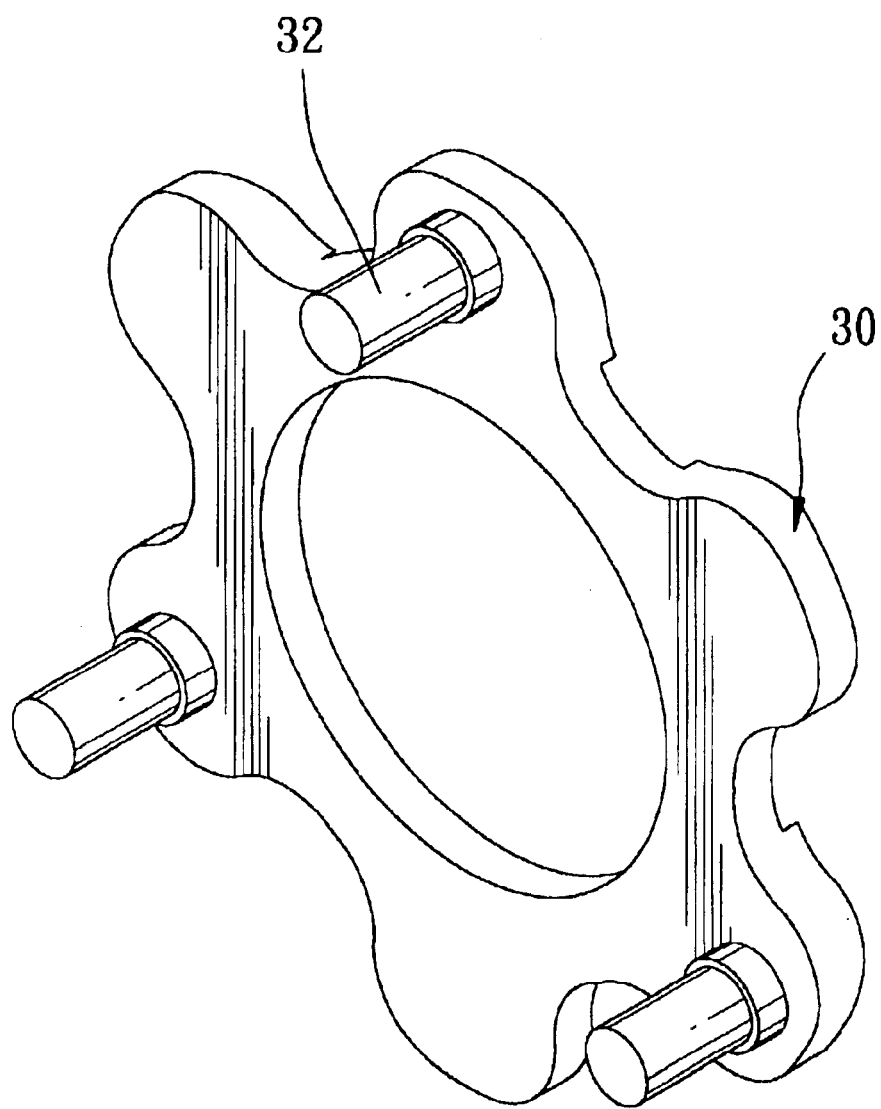
FIG. 5 is a perspective view showing a positioning ring employed in this invention.

The positioning ring 30 surrounds the axle 10, and is disposed outboard to the brake disk 100. The positioning ring 30 includes left and right surrounding surfaces 312,311 opposite to each other in the axial direction, and proximate to and distal from the abutting surface 241, respectively. A passage 313 extends from the right surrounding surface 311 through the left surrounding surface 312. A plurality of protrusions 32 (six in this embodiment) extend leftwardly and in the axial direction from the left surrounding surface 312, and are angularly displaced from one another about the axis to serve as a second splined member. Each of the protrusions 32 includes a larger-diameter segment 321 which extends from the left surrounding surface 312 and which can be mounted in the respective through hole 110 in the brake disk 100, a smaller-diameter segment 322 which extends from the larger-diameter segment 321 and which can be fitted into the respective insert hole 242 in the disk securing portion 24, and a shoulder portion 323 which is formed between the larger-diameter and smaller-diameter segments 321,322. In this manner, the brake disk 100 can be in a spline engagement with the wheel hub shell 21. Alternatively, referring to FIG. 5, the positioning ring 30 may have only three protrusions 32 so as to pass through three corresponding ones of the through holes 110 in the brake disk 100.

The surrounding locking member 40 includes an insert segment 42 which has an outer insert surface that surrounds the axis, and that is extendable through the passage 313 of the positioning ring 30 and the brake disk 100. The outer insert surface of the insert segment 42 is formed with an externally threaded section 421 to threadedly engage the internally threaded section 214. The surrounding locking member 40 further includes an abutting segment 41 which extends radially from the outer insert surface of the insert segment 42, and has an outer embossed surface 411 to confront the right surrounding surface 311.

Figure 3:
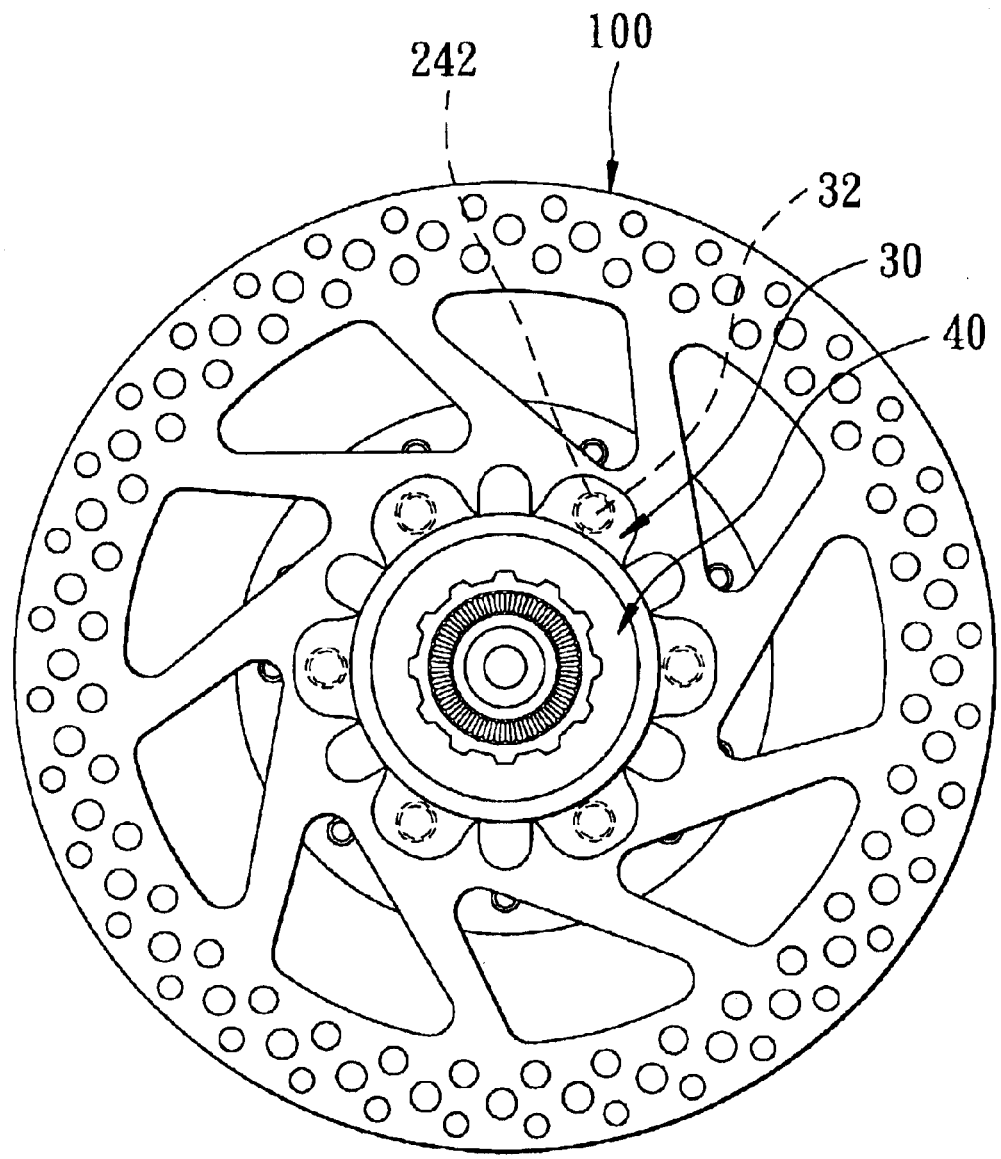
FIG. 3 is a side view of the first preferred embodiment.

After the first and second splined members engage each other, i.e. the protrusions 32 are brought to pass through the respective through holes 110 and to be fitted into the respective insert holes 242 so as to place the brake disk 100 in a spline engagement with the wheel hub shell 21, the surrounding lacking member 40 is mounted so as to have the insert segment 42 pass through the passage 313 such that the externally threaded section 421 threadedly engages the internally threaded section 214, and such that the outer embossed surface 411 abuts frictionally against the right surrounding surface 311 of the positioning ring 30, thereby forcing the left surrounding surface 312 of the positioning ring 30 to displace towards the brake disk 100 and the abutting surface 241. As such, the brake disk 100 can be secured relative to the wheel hub shell 21, as shown in FIG. 3.

To disassemble the brake disk 100 from the axle 10, the surrounding locking member 40 is operated to be screwed out of the wheel hub shell 21 so that the positioning ring 30 and the brake disk 100 can be easily detached from the axle 10.

With the construction as such, as compared with the hub disclosed in the aforesaid U.S. Pat. No. 6,371,252 B1, the wheel hub shell 21 of the brakable wheel hub device according to this invention is easy to manufacture. Specifically, the wheel hub shell 21 can be adapted from a standard wheel hub shell which is formed with a plurality of screw holes to serve as the insert holes 242.

In addition, assembly and disassembly of the brake disk 100 to and from the wheel hub shell 21 are convenient to conduct. Furthermore, since the abutting segment 41 of the surrounding locking member 40 abuts against the right surrounding surface 311 of the positioning ring 30, and since the left surrounding surface 312 abuts against the brake disk 100, i.e. the surrounding locking member 40 does not abut directly against the brake disk 100, loosening of the threaded engagement between the surrounding locking member 40 and the wheel hub shell 21 can be prevented even after prolonged use.

Figure 4:
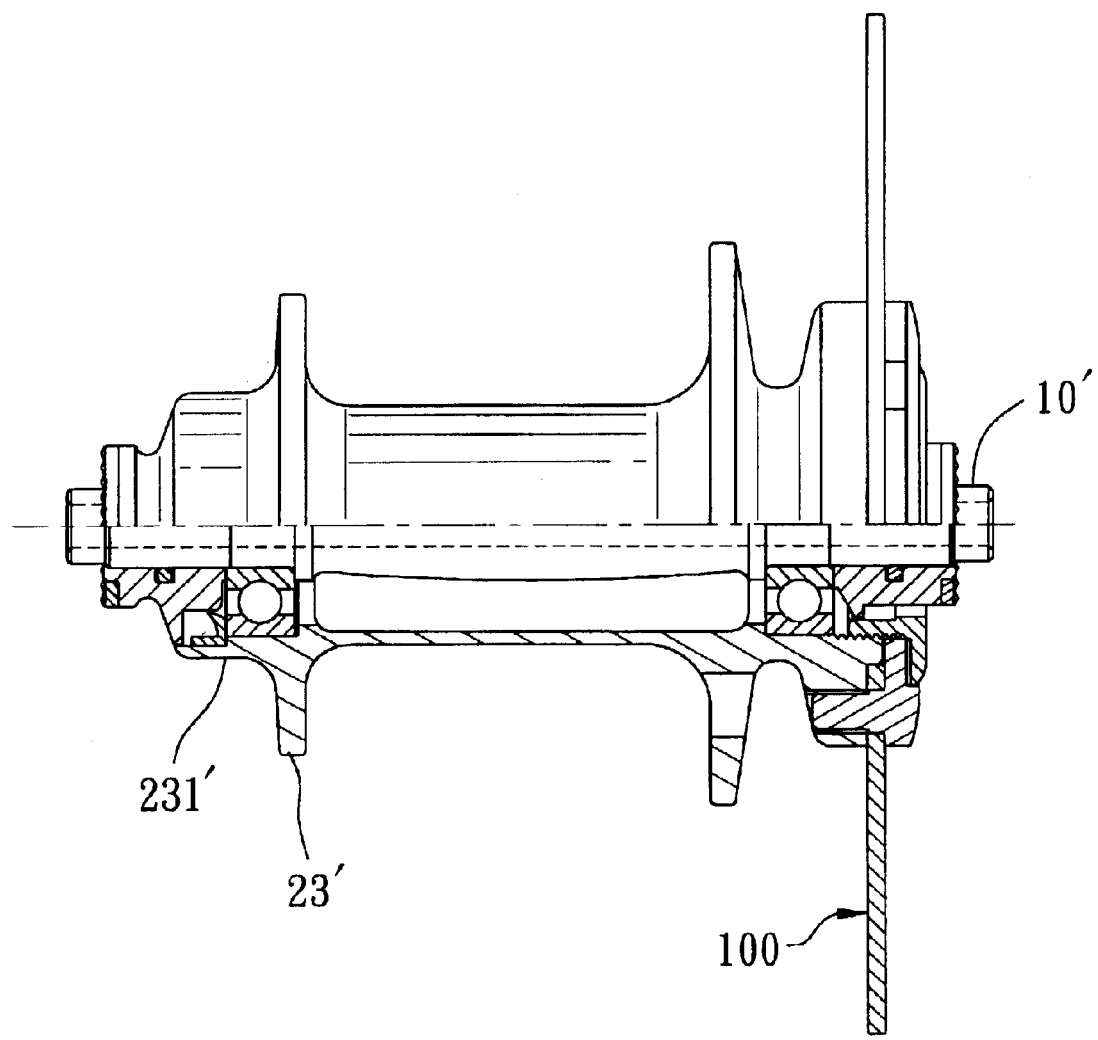
FIG. 4 is a partially sectional view of the second preferred embodiment of a brakable wheel hub device according to this invention.

Referring to FIG. 4, the second preferred embodiment of a brakable wheel hub device according to this invention is shown to be similar to the aforesaid embodiment in construction. The device of this embodiment is adapted to be mounted on a front wheel axle 10' of a bicycle, and includes a left spoke mounting flange 23' which has a smooth outer surrounding wall 231', thereby eliminating the need to provide a sprocket driving mechanism.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A brakable wheel hub device adapted to be rotatably mounted on an axle about an axis so as to secure a brake disk which surrounds the axle and which has a plurality of through holes offset from the axis, said device comprising:

a wheel hub shell having
an inner surrounding shell surface which is adapted to spacedly surround the axle, and which includes right and left inner surface segments opposite to each other along the axis, said right inner surface segment having an internally threaded section which extends in an axial direction, and
a disk securing portion which extends from said right inner surface segment radially and outwardly, and which has an outer surrounding wall surface that surrounds the axis, said disk securing portion having an abutting surface which is adapted to contact and be disposed leftwardly of the brake disk in the axial direction, and a plurality of insert holes which extend leftwardly and in the axial direction from said abutting surface;
a positioning ring adapted to surround the axle and to be disposed outboard to the brake disk, said positioning ring including left and right surrounding surfaces opposite to each other in the axial direction, and proximate to and distal from said abutting surface, respectively, a passage which extends from said right surrounding surface through said left surrounding surface, and a plurality of protrusions which extend leftwardly and in the axial direction from said left surrounding surface and which are respectively adapted to pass through the through holes in the brake disk so as to be fitted into said insert hole in the axial direction, thereby placing the brake disk in a spline engagement with said wheel hub shell; and
a surrounding locking member including an insert segment which has an outer insert surface that surrounds the axis, that is extendable through said passage and the brake disk, and that is formed with an externally threaded section to threadedly engage said internally threaded section, and an abutting segment which extends radially from said outer insert surface of said insert segment and which abuts against said right surrounding surface when said externally threaded section threadedly engage said internally threaded section, thereby forcing said left surrounding surface to displace towards the brake disk and said abutting surface.

2. The brakable wheel hub device of claim 1, wherein each of said insert holes is radially non-communicated with said outer surrounding wall surface.

3. The brakable wheel hub device of claim 2, wherein each of said protrusions includes a larger-diameter segment which extends from said left surrounding surface and which is adapted to be mounted in a respective one of the through holes in the brake disk, and a smaller-diameter segment which extends from said larger-diameter segment and which is inserted into a respective one of said insert holes.

4. The brakable wheel hub device of claim 2, wherein said abutting segment of said surrounding locking member has an outer embossed surface to confront, and frictionally abut against said right surrounding surface.

5. A brakable wheel hub device adapted to be rotatably mounted on an axle about an axis, comprising:

a wheel hub shell having an inner surrounding shell surface which is adapted to spacedly surround the axle, and which includes right and left inner surface segments opposite to each other along the axis, said right inner surface segment having an internally threaded section which extends in an axial direction, and a disk securing portion which extends from said right inner surface segment radially and outwardly, and which has an outer surrounding wall surface that surrounds the axis, said disk securing portion having an abutting surface which faces rightwardly and in the axial direction;

a brake disk which is adapted to surround the axle, and which is disposed rightwardly of said abutting surface in the axial direction, said brake disk having a plurality of through holes offset from the axis;

a positioning ring which is adapted to surround the axle, and which is disposed outboard to the brake disk, said positioning ring including left and right surrounding surfaces opposite to each other in the axial direction, and proximate to and distal from said abutting surface, respectively, and a passage which extends from said right surrounding surface through said left surrounding surface for the axle to pass therethrough;

first and second splined members respectively disposed on said abutting surface and said left surrounding surface, one of said first and second splined members passing through said through hole in said brake disk and engaging the other one of said first and second splined members so as to place said brake disk in a spline engagement with said wheel hub shell; and a surrounding locking member including an insert segment which has an outer insert surface that surrounds the axis, that is extendable through said passage and said brake disk, and that is formed with an externally threaded section to threadedly engage said internally threaded section, and an abutting segment which extends radially from said outer insert surface of said insert segment, and which abuts against said right surrounding surface when said externally threaded section threadedly engage said internally threaded section, thereby forcing said left surrounding surface to displace towards said brake disk and said abutting surface.

6. The brakable wheel hub device of claim 5, wherein said first splined member includes a plurality of insert holes which extend leftwardly and in the axial direction from said abutting surface, said second splined member including a plurality of protrusions which extend leftwardly from said left surrounding surface, and which pass through said trough holes in said brake disk to be fitted into said insert holes in the axial direction, respectively.

* * * * *